United States Patent
Ellul et al.

(10) Patent No.: US 7,872,075 B2
(45) Date of Patent: *Jan. 18, 2011

(54) PEROXIDE-CURED THERMOPLASTIC VULCANIZATES AND PROCESS FOR MAKING THE SAME

(75) Inventors: Maria D. Ellul, Silver Lake Village, OH (US); Oansuk Chung, Copley, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 518 days.

This patent is subject to a terminal disclaimer.

(21) Appl. No.: 11/246,773

(22) Filed: Oct. 7, 2005

(65) Prior Publication Data

US 2007/0083008 A1    Apr. 12, 2007

(51) Int. Cl.
- C08F 8/00 (2006.01)
- C08L 9/00 (2006.01)
- C08L 33/04 (2006.01)
- C08L 35/02 (2006.01)
- C08L 45/00 (2006.01)
- B60C 1/00 (2006.01)
- C08K 3/34 (2006.01)

(52) U.S. Cl. .......... 525/192; 525/193; 525/194; 525/210; 525/222; 525/232

(58) Field of Classification Search .......... 525/193, 525/194, 210, 222, 232
See application file for complete search history.

(56) References Cited

U.S. PATENT DOCUMENTS

| | | | |
|---|---|---|---|
| 3,806,558 A | 4/1974 | Fischer | |
| 4,087,485 A | 5/1978 | Huff | |
| 4,108,947 A | 8/1978 | Kimura et al. | |
| 4,129,700 A | 12/1978 | Mageli et al. | |
| 4,130,535 A | 12/1978 | Coran et al. | |
| 4,212,787 A | 7/1980 | Matsuda et al. | |
| 4,247,652 A | 1/1981 | Matsuda et al. | |
| 4,311,628 A | 1/1982 | Abdou-Sabet et al. | |
| 4,594,390 A | 6/1986 | Abdou-Sabet et al. | |
| 4,696,986 A | 9/1987 | Halasa et al. | |
| 4,785,045 A | 11/1988 | Yonekura et al. | |
| 4,948,840 A | 8/1990 | Berta | |
| 4,985,502 A | 1/1991 | Izumi et al. | |
| 5,100,947 A | 3/1992 | Puydak et al. | |
| 5,157,081 A | 10/1992 | Puydak et al. | |
| 5,290,866 A | 3/1994 | Dobreski et al. | |
| 5,397,832 A | 3/1995 | Ellul et al. | |
| 5,516,845 A | 5/1996 | Heese et al. | |
| 5,656,693 A | 8/1997 | Ellul et al. | |
| 5,714,545 A * | 2/1998 | Lee et al. ............. | 525/193 |
| 6,100,333 A | 8/2000 | Collina et al. | |
| 6,140,434 A | 10/2000 | Halasa et al. | |
| 6,201,080 B1 | 3/2001 | Luo et al. | |
| 6,207,746 B1 | 3/2001 | Uchida et al. | |
| 6,221,963 B1 | 4/2001 | Kobayashi et al. | |
| 6,245,856 B1 | 6/2001 | Kaufman et al. | |
| 6,268,438 B1 | 7/2001 | Ellul et al. | |
| 6,288,171 B2 | 9/2001 | Finerman et al. | |
| 6,297,301 B1 | 10/2001 | Erderly et al. | |
| 6,310,140 B1 | 10/2001 | Raetzsch et al. | |
| 6,316,090 B1 | 11/2001 | Sugimoto et al. | |
| 6,344,538 B1 | 2/2002 | Sheares | |
| 6,380,312 B1 | 4/2002 | Maldonado | |
| 6,399,706 B1 | 6/2002 | Obrecht et al. | |
| 6,451,915 B1 | 9/2002 | Ellul et al. | |
| 6,476,139 B2 | 11/2002 | Akaike et al. | |
| 6,482,892 B1 | 11/2002 | Katayama et al. | |
| 6,486,258 B1 | 11/2002 | Noguchi et al. | |
| 6,531,545 B1 | 3/2003 | Nakatsuji et al. | |
| 6,555,624 B2 | 4/2003 | Nishihara et al. | |
| 6,566,457 B2 | 5/2003 | Barghoorn et al. | |
| 6,573,333 B2 | 6/2003 | Magg | |
| 6,602,956 B2 | 8/2003 | Zhao et al. | |
| 6,602,959 B2 | 8/2003 | Vestberg et al. | |
| 6,606,852 B1 | 8/2003 | Harvey et al. | |
| 6,610,785 B1 | 8/2003 | Cecchin et al. | |
| 6,610,786 B1 | 8/2003 | Itoh et al. | |
| 6,646,056 B2 | 11/2003 | Zhao et al. | |
| 6,653,401 B2 | 11/2003 | Kinoshita et al. | |
| 6,653,405 B2 | 11/2003 | Faris et al. | |
| 6,750,292 B2 | 6/2004 | Dozeman et al. | |
| 6,765,052 B2 | 7/2004 | Shin et al. | |

(Continued)

FOREIGN PATENT DOCUMENTS

| | | |
|---|---|---|
| EP | 0 317 814 | 5/1992 |
| JP | 07/003091 | 1/1995 |
| JP | 02/037472 | 2/2002 |
| JP | 2003231780 | 8/2003 |
| JP | 2004277630 | 10/2004 |
| WO | WO 2003/042255 | 5/2003 |
| WO | WO 2005/028555 | 3/2005 |

OTHER PUBLICATIONS

Ali, Z. I. et al., "Physicochemical Properties of Irradiated and Loaded LDPE Films with Polyfunctional Monomers," Journal of Applied Polymer Science, vol. 89, pp. 2025-2035, 2003.

Ellul et al., "Crosslink Densities and Phase Morphologies in Dynamically Vulcanized TPEs," Rubber Chemistry and Technology, vol. 68, pp. 573-584 (1995).

Noordermeer, Jacobus W.M., Ethylene-Propylene Elastomers, Encyclopedia of Polymer Science and Technology, John Wiley and Sons, Inc. (2002).

Primary Examiner—Nathan M Nutter

(57) ABSTRACT

A method of preparing a thermoplastic vulcanizate, the method comprising continuously dynamically vulcanizing a rubber within a blend with a thermoplastic resin, where the dynamic vulcanization is effected with a cure system that includes a free-radical cure agent, and a coagent-wetted carrier where the coagent-wetted carrier includes a multi-functional acrylate coagent, a multi-functional methacrylate coagent, or both a multi-functional acrylate and multi-functional methacrylate coagent.

19 Claims, No Drawings

U.S. PATENT DOCUMENTS

| | | |
|---|---|---|
| 6,774,186 B2 | 8/2004 | Walton |
| 6,777,498 B2 | 8/2004 | Imai et al. |
| 6,790,911 B2 | 9/2004 | Perevosnik et al. |
| 6,861,470 B2 | 3/2005 | Watanabe et al. |
| 6,861,476 B2 | 3/2005 | Braga et al. |
| 6,867,260 B2 | 3/2005 | Datta et al. |
| 6,890,990 B2 * | 5/2005 | Cai et al. .................... 525/191 |
| 6,946,522 B2 | 9/2005 | Jacob et al. |
| 6,964,997 B2 | 11/2005 | Kikuchi et al. |
| 6,989,416 B2 | 1/2006 | Wen et al. |
| 7,022,769 B2 | 4/2006 | Park |
| 7,040,797 B1 | 5/2006 | Yamaguchi et al. |
| 7,041,739 B2 | 5/2006 | Toyoda et al. |
| 7,169,849 B2 | 1/2007 | Ikuji et al. |
| 7,193,005 B2 | 3/2007 | Leuninger et al. |
| 7,208,548 B2 | 4/2007 | Hakuta et al. |
| 7,276,559 B2 | 10/2007 | Abraham et al. |
| 7,300,980 B2 | 11/2007 | Morikawa et al. |
| 7,390,850 B2 | 6/2008 | Cook et al. |
| 7,390,866 B2 | 6/2008 | Datta et al. |
| 7,517,935 B2 | 4/2009 | Lee et al. |
| 7,691,948 B2 | 4/2010 | Takamatsu et al. |
| 2004/0242779 A1 | 12/2004 | Cai et al. |
| 2005/0032981 A1 | 2/2005 | Yu et al. |
| 2005/0277738 A1 | 12/2005 | Hoyweghen et al. |
| 2006/0052540 A1 | 3/2006 | Ellul et al. |
| 2006/0205881 A1 | 9/2006 | Gozdiff et al. |
| 2006/0287433 A1 | 12/2006 | Kanae et al. |
| 2007/0021563 A1 | 1/2007 | Kasai et al. |
| 2007/0021564 A1 * | 1/2007 | Ellul et al. .................. 525/191 |

* cited by examiner

US 7,872,075 B2

PEROXIDE-CURED THERMOPLASTIC VULCANIZATES AND PROCESS FOR MAKING THE SAME

FIELD OF THE INVENTION

One or more embodiments of the present invention relates to the use of free-radical cure systems in the preparation of thermoplastic vulcanizates, where the cure system employs a coagent and a carrier for the coagent.

BACKGROUND OF THE INVENTION

Blends of rubber and plastic have been produced with the hope of making thermoplastic elastomers, which are compositions that exhibit at least some of the properties of thermoset elastomers and yet are processable as thermoplastics. For example, U.S. Pat. No. 3,806,558 teaches blends of monoolefin copolymer rubber and polyolefin resin, where the rubber is partially cured under dynamic conditions. Peroxide curatives may be employed in this process together with auxiliary substances such as sulfur, maleimides including bismaleimides, polyunsaturated compounds (e.g., cyanurate), and acrylic esters (e.g., trimethylolpropanetrimethacrylate). The gel content of the rubber within these blends does not exceed 96%.

U.S. Pat. No. 4,247,652 teaches blends of a peroxide-curable olefin copolymer rubber. (e.g., EPDM), a peroxide-decomposing olefin plastic (e.g., isotactic polypropylene), a peroxide-non-curable hydrocarbon rubbery material (e.g., butyl rubber), and a mineral oil softener. These blends are dynamically cured by employing a peroxide in combination with a peroxy-curing promoter such as sulfur, p-quinone dioxime, p,p'-dibenzoyl- quinone dioxime, N-methyl-N,4-dinitrosoaniline, nitrobenzene, diphenyl guanidine, trimethylol propane-N,N'-m-phenylene dimaleimide, or a polyfunctional vinyl monomer such as divinyl benzene or triallyl cyanurate, or a polyfunctional methacrylate monomer such as ethyleneglycol dimethacrylate, diethyleneglycol dimethacrylate, polyethyleneglycol dimethacrylate, trimethylol propane trimethacrylate or allyl methacrylate. Despite the fact that this patent teaches partially-cured rubber, the rubber can purportedly be cured in the range from about 20 to 99% gel content in cyclohexane at 35° C.; although the data set forth in the specification suggests cured levels much lower than 99%.

Similarly, U.S. Pat. No. 4,785,045 teaches dynamically cured blends of a peroxide-crosslinkable olefinic copolymer rubber, a peroxide-crosslinkable polyolefin resin, and a peroxide-decomposable polyolefin resin. The dynamic cure is effected with a peroxide in conjunction with a crosslinking aide such as p-quinonedioxime, p,p'-dibenzoyl quinonedioxime, N-methyl-N,4-dinitrosoaniline, nitrobenzene, diphenyl guanidine, trimethylolpropane-N,N'-m-phenylene dimaleimide, divinylbenzene, triallyl cyanurate, ethylene glycol dimethacrylate, diethylene glycol dimethacrylate, polyethylene glycol dimethacrylate, trimethylolpropane trimethacrylate, allyl methacrylate, vinyl butyrate and vinyl stearate. Despite the fact that this patent teaches partially-cured rubber, the rubber can purportedly be cured in the range from about 45 to about 98% in cyclohexane. Polyfunctional methacrylate compounds that are useful as cross-linking aids in the manufacture of rubber and plastic blends are also disclosed in U.S. Pat. No. 6,765,052, which discloses ethylene glycol dimethacrylate, polyethylene glycol dimethacrylate, trimethylolpropane trimethacrylate and allyl methacrylate.

With the desire to improve upon the melt strength of blends of rubber and plastic where the rubber is partially cured, U.S. Pat. No. 6,646,056 teaches the use of multi-functional monomers with or without the presence of free radical initiators. These multi-functional monomers must include acrylate functional monomers, which are preferred over methacrylate monomers.

Blends of rubber and plastic where the rubber is fully cured are also disclosed. For Example, U.S. Pat. No. 4,130,535 teaches thermoplastic vulcanizates comprising blends of olefin rubber and thermoplastic olefin resin in which the rubber is completely cured (i.e., no more than 3% of the rubber is extractable in cyclohexane at 23° C.). Numerous cure systems are disclosed including those based upon sulfur or peroxides.

Recognizing that the use of peroxides to fully cure thermoplastic vulcanizates can have an undesirable side effect on the plastic, U.S. Pat. No. 5,656,693 teaches the use of elastomeric copolymer rubber deriving from the copolymerization of ethylene, an α-olefin, and 5-vinyl-2-norbornene. When using this particular rubber, peroxide-cured thermoplastic vulcanizates having a high degree of cure could be achieved with the use of less peroxide than had been used in the past. By employing lower levels of peroxide, those physical properties attributable to the plastic phase could be maintained.

Inasmuch as the use of peroxide cure systems to dynamically cure—and ideally fully cure—the rubber phase of thermoplastic vulcanizates may offer many advantages, there remains a desire to improve upon the peroxide cure system, particularly with regard to the impact that these systems have on the plastic phase of the thermoplastic vulcanizates.

SUMMARY OF THE INVENTION

In one or more embodiments, the present invention provides a method of preparing a thermoplastic vulcanizate, the method comprising continuously dynamically vulcanizing a rubber within a blend with a thermoplastic resin, where the dynamic vulcanization is effected with a cure system that includes a free-radical cure agent, and a coagent-wetted carrier where the coagent-wetted carrier includes a multi-functional acrylate coagent, a multi-functional methacrylate coagent, or both a multi-functional acrylate and multi-functional methacrylate coagent.

In one or more embodiments, the present invention also provides a method of preparing a thermoplastic vulcanizate, the method comprising continuously mixing a feed stream of a rubber and a thermoplastic within a continuous reactor to form a blend, adding a coagent and a carrier for the coagent to the rubber, the thermoplastic, the blend, or a combination of two or more thereof, continuously dynamically vulcanizing the rubber while the blend undergoes shear, where said continuously dynamically vulcanizing is effected with a free-radical cure agent in the presence of the coagent, and where the coagent includes a multi-functional acrylate coagent, a multi-functional methacrylate coagent, or both a multi-functional acrylate and multi-functional methacrylate coagent.

DETAILED DESCRIPTION OF ILLUSTRATIVE EMBODIMENTS

According to one or more embodiments of the present invention, thermoplastics vulcanizates are prepared by continuously dynamically curing rubber within a blend of the rubber and a thermoplastic resin. Within these or other embodiments, the dynamic cure is effected by employing a free-radical cure system that includes an acrylate or a methacrylate coagent, and the coagent is provided to the blend together with a carrier.

In one or more embodiments, the thermoplastic vulcanizates of this invention include a dynamically-cured rubber and a thermoplastic resin. Other optional ingredients or constituents include processing additives, oils, fillers, and other ingredients that are conventionally included in thermoplastic vulcanizates.

Any rubber or mixture thereof that is capable of being dynamically cured with a peroxide cure system may be used. Reference to a rubber may include mixtures of more than one rubber. Non-limiting examples of useful rubbers include olefinic elastomeric copolymers, natural rubber, styrene-butadiene copolymer rubber, butadiene rubber, acrylonitrile rubber, butadiene-styrene-vinyl pyridine rubber, urethane rubber, polyisoprene rubber, epichlorohydrin terpolymer rubber, polychloroprene, and mixtures thereof.

The term olefinic elastomeric copolymer refers to rubbery copolymers polymerized from ethylene, at least one α-olefin monomer, and optionally at least one diene monomer. The α-olefins may include, but are not limited to, propylene, 1-butene, 1-hexene, 4-methyl-1 pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinyl benzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. In the event that the copolymer is prepared from ethylene, α-olefin, and diene monomers, the copolymer may be referred to as a terpolymer or even a tetrapolymer in the event that multiple α-olefins or dienes are used.

In one or more embodiments, the olefinic elastomeric copolymers include from about 12 to about 85% by weight, or from about 20 to about 80% by weight, or from about 40 to about 70% by weight, and or from about 60 to about 66% by weight ethylene units deriving from ethylene monomer, and from about 0.1 to about 15% by weight, or from about 0.5 to about 12% by weight, or from about 1 to about 10% by weight, or from about 2 to about 8% by weight diene units deriving from diene monomer, with the balance including α-olefin units (such as propylene) deriving from α-olefin monomer. Expressed in mole percent, the terpolymer of one embodiment includes from about 0.1 to about 5 mole percent, or from about 0.5 to about 4 mole percent, or from about 1 to about 2.5 mole percent diene units deriving from diene monomer. In one or more embodiments, where the diene includes 5-ethylidene-2-norbornene the olefinic elastomeric copolymer may include at least 6% by weight, in other embodiments at least 8% by weight, and in other embodiments at least 10% by weight units deriving from 5-ethylidene-2-norbornene.

In one or more embodiments, useful olefinic elastomeric copolymers have a weight average molecular weight ($M_w$) that is greater than 50,000, in other embodiments greater than 100,000, in other embodiments greater than 200,000, and in other embodiments greater than 300,000; and the weight average molecular weight of the preferred olefinic elastomeric copolymers of one embodiment is less than 1,200,000, in other embodiments less than 1,000,000, in other embodiments less than 900,000 and in other embodiments less than 800,000. In one or more embodiments, useful olefinic elastomeric copolymers have a number average molecular weight ($M_n$) that is greater than 20,000, in other embodiments greater than 60,000, in other embodiments greater than 100,000, and in other embodiments greater than 150,000; and the number average molecular weight of the olefinic elastomeric copolymers of one or more embodiments is less than 500,000, in other embodiments less than 400,000, in other embodiments less than 300,000, and in other embodiments less than 250,000.

In one or more embodiments, useful olefinic elastomeric copolymers may also be characterized by having a Mooney viscosity ($ML_{(1+4)}$ at 125° C.) per ASTM D 1646, of from about 50 to about 500 or from about 75 to about 450. Where higher molecular weight olefinic elastomeric copolymers are employed within the thermoplastic vulcanizates of this invention, these high molecular weight polymers may be obtained in an oil-extended form. These oil-extended copolymers typically include from about 15 to about 100 parts by weight, per 100 parts by weight rubber, of a paraffinic oil. The Mooney viscosity of these oil-extended copolymers may be from about 45 to about 80 or from about 50 to about 70.

In one or more embodiments, useful olefinic elastomeric copolymers may be characterized by having an intrinsic viscosity, as measured in Decalin at 135° C., up from about 2 to about 8 dl/g, or from about 3 to about 7 dl/g, or from about 4 to about 6.5 dl/g.

In one embodiment, the elastomeric copolymer is a terpolymer of ethylene, at least one α-olefin monomer, and 5-vinyl-2-norbornene. This terpolymer is advantageous when a peroxide curative is employed as described in U.S. Pat. No. 5,656,693, which is incorporated herein by reference. In one or more embodiments, the terpolymer includes from about 40 to about 90 mole percent of its polymeric units deriving from ethylene, and from about 0.2 to about 5 mole percent of its polymeric units deriving from vinyl norbornene, based on the total moles of the terpolymer, with the balance comprising units deriving from α-olefin monomer. In other embodiments, the elastomeric copolymer includes from about 1 to about 8, and in other embodiments from about 2 to about 5% by weight units deriving from 5-vinyl-2-norbornene. Other useful olefinic elastomeric copolymers are disclosed in U.S. Pat. Nos. 6,268,438, 6,288,171, 6,245,856, and 6,867,260, and U.S Publication No. 2005/010753.

Useful olefinic elastomeric copolymers may be manufactured or synthesized by using a variety of techniques. For example, these copolymers can be synthesized by employing solution, slurry, or gas phase polymerization techniques that employ numerous catalyst systems including Ziegler-Natta systems, single-site catalysts including vanadium catalysts and Group IV-VI metallocenes, and Brookhart catalysts. Elastomeric copolymers are commercially available under the tradenames Vistalon™ (ExxonMobil Chemical Co.; Houston, Tex.), VISTAMAXX™ (ExxonMobil), Keltan™ (DSM Copolymers; Baton Rouge, La.), Nordel™ IP (DuPont Dow Elastomers; Wilmington, Del.), NORDEL MG™ (DuPont Dow Elastomers), Royalene™ (Crompton) and Buna™ (Bayer Corp.; Germany).

In one or more embodiments the rubber can be highly cured. In one embodiment, the rubber is advantageously completely or fully cured. The degree of cure can be measured by determining the amount of rubber that is extractable from the thermoplastic vulcanizate by using cyclohexane or boiling xylene as an extractant. This method is disclosed in U.S. Pat. No. 4,311,628, which is incorporated herein by reference for purpose of U.S. patent practice. In one embodiment, the rubber has a degree of cure where not more than 10 weight percent, in other embodiments not more than 6 weight percent, in other embodiments not more than 5 weight percent, and in other embodiments not more than 3 weight percent is extractable by cyclohexane at 23° C. as described in U.S. Pat. Nos. 5,100,947 and 5,157,081, which are incorporated herein by reference for purpose of U.S. patent practice. Alternatively, in one or more embodiments, the rubber has a degree of cure such that the crosslink density is preferably at least $4 \times 10^{-5}$, in other embodiments at least $7 \times 10^{-5}$, and in other embodiments at least $10 \times 10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol. 68, pp. 573-584 (1995).

Any thermoplastic resin that can be employed in the manufacture of thermoplastic vulcanizates can be used to manufacture the thermoplastic vulcanizates of this invention. Useful thermoplastic resins include solid, generally high molecular weight plastic resins. These resins include crystalline and semi-crystalline polymers including those having a crystallinity of at least 25% as measured by differential scanning calorimetry. Selection of particular resins may include those that have a melt temperature lower than the decomposition temperature of the rubber selected.

In one or more embodiments, useful thermoplastic resins may be characterized by an $M_w$ of from about 200,000 to about 2,000,000 and in other embodiments from about 300,000 to about 600,000. They are also characterized by an $M_n$ of about 80,000 to about 800,000 and in other embodiments about 90,000 to about 150,000, as measured by GPC with polystyrene standards.

In one or more embodiments, these thermoplastic resins can have a melt flow rate that is less than about 10 dg/min, in other embodiments less than about 2 dg/min, in other embodiments less than about 1.0 dg/min, and in other embodiments less than about 0.5 dg/min, per ASTM D-1238 at 230° C. and 2.16 kg load.

In one ore more embodiments, these thermoplastic resins also can have a melt temperature ($T_m$) that is from about 150° C. to about 250° C., in other embodiments from about 155 to about 170° C., and in other embodiments from about 160° C. to about 165° C. They may have a glass transition temperature ($T_g$) of from about –10 to about 10° C., in other embodiments from about –3 to about 5° C., and in other embodiments from about 0 to about 2° C. In one or more embodiments, they may have a crystallization temperature ($T_c$) of these optionally at least about 75° C., in other embodiments at least about 95° C., in other embodiments at least about 100° C., and in other embodiments at least 105° C., with one embodiment ranging from 105° to 115° C.

Also, these thermoplastic resins may be characterized by having a heat of fusion of at least 25 J/g, in other embodiments in excess of 50 J/g, in other embodiments in excess of 75 J/g, in other embodiments in excess of 95 J/g, and in other embodiments in excess of 100 J/g.

Exemplary thermoplastic resins include crystalline and crystallizable polyolefins. Also, the thermoplastic resins may include copolymers of polyolefins with styrene such as styrene-ethylene copolymer. In one embodiment, the thermoplastic resins are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Specifically included are the reactor, impact, and random copolymers of propylene with ethylene or the higher α-olefins, described above, or with $C_{10}$-$C_{20}$ diolefins. Comonomer contents for these propylene copolymers will typically be from 1 to about 30% by weight of the polymer, for example. See U.S. Pat. Nos. 6,268,438, 6,288,171, 6,867,260 B2, 6,245,856, and U.S. Publication No. 2005/010753, which are incorporated herein by reference. Copolymers available under the tradename VISTAMAXX™ (ExxonMobil) are specifically included. Blends or mixtures of two or more polyolefin thermoplastics such as described herein, or with other polymeric modifiers, are also suitable in accordance with this invention. These homopolymers and copolymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In one embodiment, the thermoplastic resin includes a high-crystallinity isotactic or syndiotactic polypropylene. This polypropylene can have a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate can be employed. These polypropylene resins are characterized by a melt flow rate that is less than or equal to 10 dg/min, optionally less than or equal to 1.0 dg/min, and optionally less than or equal to 0.5 dg/min per ASTM D-1238 at 2.16 kg load.

In one embodiment, the thermoplastic resin includes a propylene copolymer deriving from the copolymerization of monomer including i) propylene, ii) an α, internal non-conjugated diene monomer, iii) optionally an α, ωnon-conjugated diene monomer, and iv) optionally ethylene, or a propylene copolymer deriving from the copolymerization of monomer including i) propylene, ii) an olefin containing a labile hydrogen, and iii) optionally ethylene. These propylene copolymers are disclosed in U.S. Ser. No. 10/938,369, which is incorporated herein by reference. These propylene copolymers can be used as the sole thermoplastic component, or they may be used in conjunction with other thermoplastic resins including those described herein.

In certain embodiments, the thermoplastic vulcanizate may include a polymeric processing additive. The processing additive may be a polymeric resin that has a very high melt flow index. These polymeric resins include both linear and branched polymers that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers. Thermoplastic vulcanizates that include similar processing additives are disclosed in U.S. Pat. No. 6,451,915, which is incorporated herein by reference for purpose of U.S. patent practice.

In one or more embodiments, the thermoplastic vulcanizates may include a mineral oil, a synthetic oil, or a combination thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers include isobutenyl mer units. Exemplary synthetic oils include polyisobutylene, poly (isobutylene-co-butene), polybutadiene, poly(butadiene-co-butene), and mixtures thereof. In one or more embodiments, synthetic oils may include polylinear α-olefins, polybranched α-olefins, hydrogenated polyalphaolefins, and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C.; in these or other embodiments, the viscosity of these oils can be less than 4,000 cp and in other embodiments less than 1,000 cp.

In one or more embodiments, these oligomers can be characterized by a number average molecular weight ($M_n$) of from about 300 to about 9,000 g/mole, and in other embodiments from about 700 to about 1,300 g/mole.

Useful synthetic oils can be commercially obtained under the tradenames Polybutene™ (Soltex; Houston, Tex.), Indopol™ (BP; Great Britain), and Parapol™ (ExxonMobil). Oligomeric copolymers deriving from butadiene and its comonomers are commercially available under the tradename Ricon Resin™ (Ricon Resins, Inc; Grand Junction, Colo.). White synthetic oil is available under the tradename SPECTRASYNT™ (ExxonMobil), formerly SHF Fluids (Mobil).

In one or more embodiments, the extender oils may include organic esters, alkyl ethers, or combinations thereof including those disclosed in U.S. Pat. Nos. 5,290,866 and 5,397,832, which are incorporated herein by reference. In one or more embodiments, the organic esters and alkyl ether esters may have a molecular weight that is generally less than about 10,000. In one or more embodiments, suitable esters include monomeric and oligomeric materials having an average molecular weight of below about 2,000 and in other embodiments below about 600. In one or more embodiments, the esters may be compatible or miscible with both the polyalphaolefin and rubber components of the composition; i.e., they may mix with other components to forma single phase. In one or more embodiments, the esters include aliphatic mono- or diesters, or alternatively oligomeric aliphatic esters or alkyl ether esters. In one or more embodiments, the thermoplastic vulcanizates are devoid of polymeric aliphatic esters and aromatic esters, as well as phosphate esters.

In addition to the rubber, thermoplastic resins, and optional processing additives, the thermoplastic vulcanizates of the invention may optionally include reinforcing and non-reinforcing fillers, antioxidants, stabilizers, rubber processing oil, lubricants, antiblocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

In one or more embodiments, the thermoplastic vulcanizates of this invention contain a sufficient amount of the rubber to form rubbery compositions of matter. The skilled artisan will understand that rubbery compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 25 percent by weight, in other embodiments at least about 45 percent by weight, in other embodiments at least about 65 percent by weight, and in other embodiments at least about 75 percent by weight rubber. In these or other embodiments, the amount of rubber within the thermoplastic vulcanizates can be from about 15 to about 90 percent by weight, in other embodiments from about 45 to about 85 percent by weight, and in other embodiments from about 60 to about 80 percent by weight, based on the entire weight of the rubber and thermoplastic combined.

In one or more embodiments, the amount of thermoplastic resin within the thermoplastic vulcanizates can be from about 15 to about 85% by weight, in other embodiments from about 20 to about 75% by weight, based on the entire weight of the rubber and thermoplastic combined. In these or other embodiments, the thermoplastic vulcanizates can include from about 15 to about 25, and in other embodiments from about 30 to about 60, and in other embodiments from about 75 to about 300 parts by weight thermoplastic resin per 100 parts by weight rubber.

When employed, the thermoplastic vulcanizates may include from about 0 to about 20 parts by weight, or from about 1 to about 10 parts by weight, or from about 2 to about 6 parts by weight of a polymeric processing additive per 100 parts by weight rubber.

Fillers, such as carbon black or clay, may be added in amount from about 10 to about 250, per 100 parts by weight of rubber. The amount of carbon black that can be used depends, at least in part, upon the type of carbon black and the amount of extender oil that is used.

Generally, from about 5 to about 300 parts by weight, or from about 30 to about 250 parts by weight, or from about 70 to about 200 parts by weight, of extender oil per 100 parts rubber can be added. The quantity of extender oil added depends upon the properties desired, with the upper limit depending upon the compatibility of the particular oil and blend ingredients; this limit is exceeded when excessive exuding of extender oil occurs. The amount of extender oil depends, at least in part, upon the type of rubber. High viscosity rubbers are more highly oil extendable. Where ester plasticizers are employed, they are generally used in amounts less than about 250 parts, or less than about 175 parts, per 100 parts rubber.

In the process of the invention, the rubber is cured or crosslinked by dynamic vulcanization. Dynamic vulcanization includes a vulcanization or curing process for a rubber within a blend with a thermoplastic resin, where the rubber may be crosslinked or vulcanized under conditions of high shear at a temperature above the melting point of the thermoplastic. In one embodiment, the rubber can be simultaneously crosslinked and dispersed as fine particles within the thermoplastic matrix, although other morphologies may also exist.

In one or more embodiments, dynamic vulcanization can be effected by employing a continuous process. Continuous processes may include those processes where dynamic vulcanization of the rubber is continuously achieved, thermoplastic vulcanizate product is continuously removed or collected from the system, and/or one or more raw materials or ingredients are continuously fed to the system during the time that it may be desirable to produce or manufacture the product.

In one or more embodiments, continuous dynamic vulcanization can be effected within a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruder). These reactive extruders may be equipped with two lobe or multi-lobe mixing blades or paddles, which may also be referred to as elements. These continuous mixing reactors may also be characterized by a length over diameter (L/D) that is greater than 30, in other embodiments greater than 40, and in other embodiments greater than 50, with particular embodiments having a length over diameter of from about 45 to 60. Also, these continuous mixing reactors may be characterized by a barrel diameter that may be from about 25 to about 360 mm, in other embodiments from about 35 to about 300 mm, and in other embodiments from about 50 to about 250 mm. Continuous mixers are commercially available from sources such as Coperion, Leistritz, Berstorff, Japan Steel Works, and Black Verfahrenstechnik GmbH.

In one or more embodiments, these continuous mixing reactors may be operated at shear rates in excess of 1,000 s⁻, in other embodiments in excess of $2,000 \text{ s}^{-1}$, and in other embodiments in excess of 4,500 s⁻. In these or other embodiments, sufficient shear rates can be achieved with multi-lobe mixing blades operated at about 200 to about 400 rpm, and in other embodiments at about 250 to about 350 rpm. Or, where two-lobe mixing blades are employed at 300 to about 1,200 rpm, and in other embodiments from about 400 to about 1,000 rpm. Methods for continuously preparing thermoplastic vulcanizates are described in U.S. Pat. Nos. 4,311,628, 4,594,390, and 5,656,693 which are incorporated herein by reference for purpose of U.S. patent practice, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed. Multiple step continuous processes can also be employed whereby ingredients such as plastics, oils, and scavengers can be added after dynamic vulcanization has been achieved as disclosed in International Application No. PCT/US04/30517 (International Publication No. WO 2005/028555), which is incorporated herein by reference for purpose of U.S. patent practice.

In one or more embodiments, the cure system employed in practicing this invention includes a free-radical cure agent and a coagent. Free-radical cure agents include peroxides such as organic peroxides. Examples of organic peroxides include, but are not limited to, di-tert-butyl peroxide, dicumyl peroxide, t-butylcumyl peroxide, α,α-bis(tert-butylperoxy) diisopropyl benzene, 2,5-dimethyl-2,5-di(t-butylperoxy) hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Useful peroxides and their methods of use in dynamic vulcanization of thermoplastic vulcanizates are disclosed in U.S. Pat. No. 5,656,693, which is incorporated herein by reference for purpose of U.S. patent practice.

In one or more embodiments, the coagent includes a multi-functional acrylate ester, a multi-functional methacrylate ester, or combination thereof. In other words, the coagents include two or more organic acrylate or methacrylate substituents.

Examples of multi-functional acrylates include diethylene glycol diacrylate, trimethylolpropane triacrylate (TMPTA), ethoxylated trimethylolpropane triacrylate, propoxylated trimethylolpropane triacrylate, propoxylated glycerol triacrylate, pentaerythritol triacrylate, bistrimethylolpropane tetraacrylate, pentaerythritol tetraacrylate, ethoxylated pentaerythritol tetraacrylate, ethoxylated pentaerythritol triacrylate, cyclohexane dimethanol diacrylate, ditrimethylolpropane tetraacrylate, or combinations thereof.

Examples of multi-functional methacrylates include trimethylol propane trimethacrylate (TMPTMA), ethylene glycol dimethacrylate, butanediol dimethacrylate, butylene glycol dimethacrylate, diethylene glycol dimethacrylate, polyethylene glycol dimethacrylate, allyl methacrylate, or combinations thereof.

In one or more embodiments of this invention, the coagent is provided to the blend or an ingredient thereof together with a carrier. In one or more embodiments, providing the coagent to the blend or an ingredient thereof may include charging, adding, mixing, feeding, injecting, and/or delivering the coagent to the blend or an ingredient thereof. In one or more embodiments, the coagent and carrier may be added to the continuous mixing equipment at the feed throat of the reactor. In other embodiments, the coagent and carrier may be added within various barrel sections or locations after the feed throat but prior to the location that dynamic vulcanization is achieved. In these or other embodiments, the coagent and carrier may be added within the first 50% of the length of the continuous mixing reactor. The coagent and carrier can be fed continuously into the continuous reactor at a single location or in multiple locations. The metering of the coagent and carrier feed can occur at a constant rate or incrementally. Where the coagent is first provided to an ingredient of the blend, a masterbatch may be formed with the coagent, carrier, and the one or more ingredients of the blend. For example, the coagent and carrier can be pre-blended with the rubber and/or thermoplastic resin prior to blending the thermoplastic resin with the rubber.

In one or more embodiments, the carrier includes a solid material; i.e., materials that are solids at standard conditions. The solids may include particulate materials. In one or more embodiments, these solids may include those compounds that, in the absence of the coagent, would be non-reactive with respect to the other ingredients or constituents of the thermoplastic vulcanizate. In one or more embodiments, the carrier is non-acidic; in these or other embodiments, the carrier may be treated to reduce acidity.

In one or more embodiments, the carrier may include silica, silicates, or a combination thereof. Silica may include precipitated silica, amorphous fumed silica, fused silica, silica gel, and/or mixtures thereof. Silicates may include those compounds containing silicon, oxygen, and one or more metals with or without hydrogen. Both synthetic and naturally occurring silicates may be used in one or more embodiments. Examples of naturally occurring silicates include gemstones, berly, asbestos, talc, clays, feldspar, mica, and mixtures thereof. An example of a synthetic silicate includes sodium silicate. Examples of silicates include tetracalcium aluminoferrate, tricalcium silicate, dicalcium silicate, calcium metasilicate, and mixtures thereof. Other useful silicates include hydrated aluminum silicates, which may also be referred to as clays. Exemplary clays include kaolinite, montmorillonite, atapulgite, illite, bentonite, halloysite, and mixtures thereof. Still other useful silicates include hydrated magnesium silicates, which may be referred to as talcs. Exemplary talcs include talcum, soapstone, steatite, cerolite, magnesium talc, steatite-massive, and mixtures thereof.

In one or more embodiments, the carrier may be characterized by a particle size (i.e., average diameter) of from about 100× to about 100 nm, in other embodiments from about 0.1 μm to about 10 μm, and in other embodiments form about 2 μm to about 5 μm.

The combination of coagent and carrier may be referred to as a coagent-wetted carrier or as a powdered liquid dispersion. In one or more embodiments, the combination of coagent and carrier may include a physical blend of a liquid coagent and carrier. In these or other embodiments, the coagent and carrier may be intimately mixed to form a free flowing powder.

In one or more embodiments, the concentration of coagent on the coagent-wetted carrier may be from about 25% to about 80% by weight, in other embodiments from about 50% to about 70% by weight, and in other embodiments form about 55% to about 65% by weight based upon the total weight of the coagent-wetted carrier.

Coagent-wetted carriers are commercially available. For example, trimethlolpropane trimethacrylate on synthetic calcium silicate at 75 weight percent is available under the tradenames FLOWSPERSE™, PLB-5405, B-5405, and D-8308 (FlowPolymers, Inc.), trimethylolpropane trimethacrylate on silicon dioxide at 50 weight percent is available under the tradename FLOWSPERSETM™, and FPC(SR350)-50 (Flow Polymers, Inc.), trimethylolpropane triacrylate on silica carrier at 75 weight percent is available under the tradename FLOWSPERSETM™ PLC-604 (Flow Polymers, Inc.). Still other commercial examples include butanediol dimethacrylate on silica at 75 weight percent is available under the tradename Rhenofit™ BDMA/S (Rhein Chemie), ethyleneglycol dimethacrylate on silica at 70 weight percent is available under the tradename Rhenofit™ EDMA/S (Rhein Chemie), trimethylolpropane trimethacrylate on an inert mineral filler at 72 weight percent is available under the tradename PLC(TMPTMA)-72™ (Rhein Chemie), trimethylolpropane trimethacrylate on an inert mineral filler at 70 weight percent is available under the tradename Rhenofit™ TRIM/S (Rhein Chemie), ethyleneglycol dimethacrylate on an inert mineral filler at 72 weight percent is available under the tradename PLC(SR206)-72™ (Rhein Chemie), and buthyleneglycol dimethacrylate on an inert mineral filler at 72 weight percent is available under the tradename PLC9SR297)-72.

In addition to the multi-functional acrylate or multi-functional methacrylate coagent, a complementary coagent may be used. Useful complementary coagents may include high-vinyl polydiene or polydiene copolymer, triallylcyanurate, triallyl isocyanurate, triallyl phosphate, sulfur, N-phenyl bis-maleamide, divinyl benzene, trimethylol propane tri-methacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, or oximers such as quinone dioxime.

The skilled artisan will be able to readily determine a sufficient or effective amount of curative and/or coagent to be employed without undue calculation or experimentation.

For example, where a di-functional peroxide is employed, the peroxide can be employed in an amount from about $1\times10^{-5}$ moles to about $1\times10^{-1}$ moles, optionally from about $1\times10^{-4}$ moles to about $9\times10^{-2}$ moles, and optionally from about $1\times10^{-2}$ moles to about $4\times10^{-2}$ moles per 100 parts by weight rubber. Those skilled in the art will be able to readily calculate the number of moles that would be useful for other peroxide based upon this teaching; for example, more peroxide might be useful for monofunctional peroxide compounds, and less peroxide might be useful where peroxides having greater functionality are employed. The amount may also be expressed as a weight per 100 parts by weight rubber. This amount, however, may vary depending on the curative employed. For example, where 4,4-bis(tert-butyl peroxy) diisopropyl benzene is employed, the amount employed may include from about 0.5 to about 12 and optionally from about 1 to about 6 parts by weight per 100 parts by weight rubber.

Where trimethylol propane trimethacrylate is employed as a coagent, useful amounts include from about 1.5 to about 10, in other embodiments from about 3.0 to about 6.0 parts by weight, and in other embodiments from about 4.0 to about 5.0 parts by weight trimethylol propane trimethacrylate per 100 parts by weight rubber.

Those skilled in the art will readily appreciate useful amounts of coagent-wetted carrier that should by provided based upon the concentration of coagent associated with the wetted carrier. For example, where the coagent-wetted carrier is 50% active (i.e., includes 50 weight percent coagent), then from about 6 to about 9 parts by weight coagent-wetted carrier should be employed when from about 3 to about 4.5 parts by weight coagent is desired.

Despite the fact that the rubber may be partially or fully cured, the compositions of this invention can be processed and reprocessed by conventional plastic processing techniques such as extrusion, injection molding, blow molding, and compression molding. The rubber within these thermoplastic elastomers can be in the form of finely-divided and well-dispersed particles of vulcanized or cured rubber within a continuous thermoplastic phase or matrix. In other embodiments, a co-continuous morphology or a phase inversion can be achieved. In those embodiments where the cured rubber is in the form of finely-divided and well-dispersed particles within the thermoplastic medium, the rubber particles can have an average diameter that is less than 50 μm, optionally less than 30 μm, optionally less than 10 μm, optionally less than 5 μm, and optionally less than 1 μm. In certain embodiments, at least 50%, optionally at least 60%, and optionally at least 75% of the particles have an average diameter of less than 5 μm, optionally less than 2 μm, and optionally less than 1 μm.

The thermoplastic elastomers of this invention are useful for making a variety of articles such as weather seals, hoses, belts, gaskets, moldings, boots, elastic fibers and like articles. They are particularly useful for making articles by blow molding, extrusion, injection molding, thermo-forming, elasto-welding and compression molding techniques. More specifically, they are useful for making vehicle parts such as weather seals, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced Vs or molded gum with short fiber flocked V's.

In order to demonstrate the practice of the present invention, the following examples have been prepared and tested. The examples should not, however, be viewed as limiting the scope of the invention. The claims will serve to define the invention.

EXAMPLES

Samples 1-4

Four thermoplastic vulcanizates were prepared by dynamically vulcanizing an elastomeric copolymer within a Brabender mixer. Dynamic vulcanization was achieved by using a peroxide cure system that included trimethylol propane trimethacrylate (TMPTMA). In samples 1 and 2, the TMPTMA was provided as a neat liquid. In samples 3 and 4, the TMPTMA was provided with a carrier.

The ingredients included 100 parts by weight of elastomeric copolymer (this amount refers only to the rubber component even though the stock included 100 parts by weight rubber and 100 parts by weight oil), 56 parts by weight thermoplastic polymer, 125 total parts by weight paraffinic oil (125 parts including the 100 parts inclusive with the rubber), 42 parts by weight clay, and 2 part by weight antioxidant, each based on 100 parts by weight of the elastomeric copolymer.

The elastomeric copolymer was poly(ethylene-co-propylene-co-vinyl norbornene) characterized by having a diene content of about 3 weight percent, a Mooney viscosity $ML_{(1+4)}$@125° C. of about 50 (oil extended), an ethylene content of about 63 weight percent, and an oil content of 100 phr, although as described above, the parts by weight rubber disclosed above simply refers to the amount of rubber even though the rubber stock included an oil. The peroxide was 2,5-dimethyl -2,5-di(t-butylperoxy)hexane obtained under the tradename DBPH PAR 100™ (Rhein Chemie); this peroxide was 50% active in paraffinic oil which refers to the fact that the ingredient included 50% by weight of the active peroxide compound and 50% by weight paraffinic oil. The thermoplastic resin was characterized by MFR 0.7 dg/min. The antioxidant was tetrakis(methylene 3,5-ditert-butyl-4 hydroxy hydrocinnamate)methane obtained under the tradename IRGANOXTM™1010 (Ciba Geigy). The neat coagent was obtained under tradename SR350 (Sartomer), and the coagent with carrier (i.e., coagent-wetted carrier) was obtained under the tradename FlowSperse PLB-5405, which was 75% active with synthetic calcium silicate carrier.

The amount of peroxide and coagent employed in each sample is set forth in Table I. The designation within the tables indicating coagent with carrier refers to a coagent-wetted carrier. Also provided in Table I are the results of various tests that were conducted on the samples following dynamic vulcanization.

The amounts provided in Table I, as well as the other tables in this specification, are provided in parts by weight per 100 parts by weight rubber (phr) unless otherwise specified. The thermoplastic vulcanizates that are comparative samples have been designated with the letter "C" and those that are within the invention have been labeled with the letter "I."

TABLE I

| | Sample | | | |
|---|---|---|---|---|
| | 1 | 2 | 3 | 4 |
| Comparative/Invention | C | C | I | I |
| Peroxide | 3.30 | 6.60 | 3.30 | 6.60 |
| Coagent | | | | |
| Neat | 2.24 | 4.48 | — | — |
| With Carrier | — | — | 2.80 | 5.60 |
| Properties | | | | |
| Shore A (Iso) | 66 | 68 | 66 | 68 |
| Shore A (ASTM) | 63 | 64 | 63 | 65 |
| UTS (MPa) | 6.91 | 6.66 | 6.53 | 6.62 |
| UE % | 365 | 250 | 370 | 274 |
| M100 (MPa) | 3.05 | 3.60 | 2.96 | 3.49 |
| Wt. Gain %; 121° C. @ 24 hrs | 101 | 83 | 107 | 89 |
| Tension Set (%) | 9.5 | 7.5 | 10.0 | 8.5 |
| Compression Set (%), 1 wk @ 100 C. | 38 | 29 | 37 | 31 |
| LCR Viscosity, Pa s @ 204 C., 1200 1/s | 97 | 89 | 98 | 93 |
| Die Swell, (%) | 11-16 | 5-11 | 14-18 | 4-13 |

Shore hardness was determined according to ISO 868 and ASTM D-2240. Ultimate tensile strength, ultimate elongation, and 100% modulus were determined according to ASTM D-412 at 23EC by using an Instron testing machine. Weight gain was determined according to ASTM D-471. Tension set and compression set were determined according to ASTM D-142. LCR capillary viscosity was determined with a DyniSco™ Capillary rheometer at 30:1 L/D at 1200 $S^{-1}$. The samples were subjected to accelerated heat aging within an air circulating oven at 150° C. for one week. Die swell was determined by a lever device. The extrusion surface roughness (ESR) was determined as described by Ellul et al., in "Chemical Surface Treatments Of Natural Rubber And EPDM Thermoplastic Elastomers: Effects On Friction And Adhesion," RUBBER CHEMISTRY AND TECHNOLOGY, Vol. 67, No. 4, pg. 582 (1994).

The data in Table I shows that useful thermoplastic vulcanizates can be prepared by employing a coagent that is provided together with a carrier; in fact, the properties achieved were similar to those obtained when a neat coagent was used.

Samples 5-10

Six additional thermoplastic vulcanizates were prepared by employing continuous mixing techniques within a reactive extruder using procedures and techniques as generally set forth in U.S. Pat. Nos. 4,594,390 and 5,656,693, which are incorporated herein by reference. The hardness of the thermoplastic vulcanizate was varied; and for each hardness, the use of a neat coagent versus a coagent-wetted carrier was compared.

The ingredients included 100 parts by weight of elastomeric copolymer (this amount refers only to the rubber component even though the stock included about 100 parts by weight rubber and about 75 parts by weight oil), about 133 total parts by weight paraffinic oil (133 parts including the 100 parts inclusive with the rubber or other ingredients), 42 parts by weight clay, 1.94 parts by weight zinc oxide, 1.5 part by weight antioxidant, and 3.25 parts by weight peroxide, each based on 100 parts by weight of the elastomeric copolymer.

The elastomeric copolymer was poly(ethylene-co-propylene-co-ethylidene-2-norbornene) characterized by having a diene content of about 4 weight percent, a Mooney viscosity $ML_{(1+4)}$@125° C. of about 48 (oil extended), an intrinsic viscosity (dl/g) in Decalin of about 3.7 dl/g, a weight average molecular weight of about 1,600 kg/mole, a number average molecular weight of about 170 kg/mole, an ethylene content of about 64 weight percent, and an oil content of 75 phr, although as described above, the parts by weight rubber disclosed above simply refers to the amount of rubber even though the rubber stock included an oil. The peroxide was 2,5-dimethyl-2,5-di(t-butylperoxy)hexane obtained under the tradename DBPH PAR 100™ (Rhein Chemie); this peroxide was 50% active in paraffinic oil which refers to the fact that the ingredient included 50% by weight of the active peroxide compound and 50% by weight paraffinic oil. The thermoplastic resin was characterized by MFR 0.7 dg/min. The antioxidant was tetrakis(methylene 3,5-ditert-butyl-4 hydroxy hydrocinnamate)methane obtained under the tradename IRGANOX™ 1010 (Ciba Geigy), and was provided as a slurry that includes 1.5 parts by weight antioxidant and 5.0 parts by weight paraffinic oil.

Table II provides the total amount of thermoplastic resin employed in each sample, although it is noted that 30 weight percent of the total thermoplastic resin was added after dynamic cure was achieved in a fashion similar to that described in International Publication No. WO 2005/028555. Also, about 30 weight percent of the total oil was added after dynamic cure was achieved.

cause feeding problems in the continuous mixing process. This resulted in clogging and eventual seizure of the pumping device due to pre-reaction of the neat coagent. By contrast, the powder liquid concentrate exhibited no such problems and resulted in overall better formation in the thermoplastic vulcanizate manufactured by a continuous extrusion mixing process.

Samples 11-16

Six additional thermoplastic vulcanizates were prepared in a similar fashion to samples 5-10, except that each sample employed a coagent with carrier, and the amount of coagent employed was varied as set forth in Table III. Table III also provides the total amount of thermoplastic resin, although it is noted that about 40 weight percent of the plastic was added

TABLE II

| | Sample No. | | | | | |
|---|---|---|---|---|---|---|
| | 5 | 6 | 7 | 8 | 9 | 10 |
| Comparative/Invention | I | C | I | C | I | C |
| Thermoplastic Resin | 50 | 50 | 59 | 59 | 70 | 70 |
| Coagent | | | | | | |
| Neat | — | 6.0 | — | 6.0 | — | 6.0 |
| With Carrier | 8.0 | — | 8.0 | — | 8.0 | — |
| Properties | | | | | | |
| Shore A (Iso) | 69.7 | 68.5 | 71.6 | 73 | 77.6 | 76.7 |
| UTS (MPa) | 6.92 | 5.81 | 6.90 | 6.26 | 6.90 | 6.64 |
| UE % | 445 | 368 | 462 | 368 | 442 | 407 |
| M100 (MPa) | 2.72 | 2.64 | 2.78 | 3.13 | 3.46 | 6.32 |
| Wt. Gain %; 121° C. @ 24 hrs | 82 | 90 | 92 | 78 | 77 | 82 |
| LCR Viscosity, Pa s @ 204 C., 1200l/s | 59 | 61.2 | 58.2 | 54.7 | 49.1 | 54 |
| ESR (Mico Inch) | 81 | 61 | 60 | 50 | 84 | 72 |
| Tension Set % | 12.5 | 9 | 11 | 11 | 13.5 | 12.5 |
| Compression Set %, 1 wk @ 100 C. | 36 | 33 | 37 | 39 | 38 | 40 |

The data in Table II shows that the use of a coagent-wetted carrier provides for thermoplastic vulcanizates having a better overall balance of properties as compared to those thermoplastic vulcanizates that were prepared by using a neat coagent. Neat coagent was overly reactive and tended to after dynamic vulcanization was achieved. Each sample also included 3.25 parts by weight peroxide and 24.4 parts by weight of carbon black concentrate, which included 40 percent by weight carbon black and 60 percent by weight polypropylene.

TABLE III

| | Sample | | | | | |
|---|---|---|---|---|---|---|
| | 11 | 12 | 13 | 14 | 15 | 16 |
| Comparative/Invention | I | I | I | I | I | I |
| Thermoplastic Resin | 38 | 38 | 45.6 | 45.6 | 53.2 | 53.2 |
| Coagent with Carrier | 8 | 3 | 8 | 3 | 8 | 3 |
| Properties | | | | | | |
| Shore A Hardness (Iso) | 71.5 | 68.4 | 74.2 | 69.3 | 75.1 | 75.2 |
| UTS (MPa) | 6.75 | 6.65 | 6.81 | 6.32 | 6.94 | 7.05 |
| UE (%) | 341 | 450 | 374 | 441 | 436 | 471 |
| M100 (MPa) | 3.13 | 2.68 | 3.18 | 2.65 | 3.06 | 3.22 |
| Wt. Gain %; 121° C. @ 24 hrs | 77.0 | 97.0 | 78.0 | 108.0 | 88.0 | 93.0 |
| LCR Viscosity, Pa s @ 204 C., 1200l/s | 76.9 | 69.1 | 70.1 | 69.5 | 72.5 | 64.2 |
| ESR (Micro Inch) | 46 | 48 | 46 | 44 | 43 | 35 |
| Tension Set (%) | 10.5 | 12.5 | 12.0 | 15.0 | 12.5 | 17.5 |

The data in Table III shows that the use of a coagent-wetted carrier provides for thermoplastic vulcanizates having a good overall balance of properties. Particularly, the extrusion surface roughness was advantageously desirable. Also, it is noted that lower levels of coagent with carrier can be used without significant deterioration in properties.

Various modifications and alterations that do not depart from the scope and spirit of this invention will become apparent to those skilled in the art. This invention is not to be duly limited to the illustrative embodiments set forth herein.

What is claimed is:

1. A method of preparing a thermoplastic vulcanizate, the method comprising:
   continuously dynamically vulcanizing, in a continuous mixing reactor:
      a rubber consisting essentially of an olefinic elastomeric copolymer, and
      a thermoplastic resin,
   wherein the dynamic vulcanization is effected solely with a single cure system that consists of:
      an organic peroxide cure agent, and
      a coagent-wetted carrier consisting essentially of:
         (1) a multi-functional acrylate coagent selected from the group consisting of diethylene glycol diacrylate, trimethylolpropane triacrylate (TMPTA), ethoxylated trimethylolpropane triacrylate, propoxylated trimethylolpropane triacrylate, propoxylated glycerol triacrylate, pentaerythritol triacrylate, bistrimethylolpropane tetraacrylate, pentaerythritol tetraacrylate, ethoxylated pentaerythritol tetraacrylate, ethoxylated pentaerythritol triacrylate, cyclohexane dimethanol diacrylate, ditrimethylolpropane tetraacrylate, or combinations thereof, a multi-functional methacrylate coagent selected from the group consisting of ethylene glycol dimethacrylate, butanediol dimethacrylate, butylene glycol dimethacrylate, diethylene glycol dimethacrylate, polyethylene glycol dimethacrylate, allyl methacrylate or combinations thereof, or both a multi-functional acrylate and multi-functional methacrylate coagent, and
         (2) silica, silicates or a combination thereof.

2. The method of claim 1, where the organic peroxide includes 2,5-dimethyl-2,5-di(t-butylperoxy)hexane.

3. The method of claim 1, where the rubber consists of an olefinic elastomeric copolymer of ethylene, at least one α-olefin, and optionally at least one diene monomer.

4. The method of claim 3, where said continously dynamically vulcanizing cures the rubber to an extent where not more than 10 weight percent of the rubber is extractable by cyclohexane at 23° C.

5. The method of claim 1, where the silica includes precipitated silica, amorphous fumed silica, fused silica, silica gel, or mixtures thereof 6. The method of claim 1, where said silicates are selected from the group consisting of tetracalcium aluminoferrate, tricalcium silicate, dicalcium silicate, calcium metasilicate, and mixtures thereof 7. The method of claim 1, where said silicates are selected from the group consisting of kaolinite, montmorillonite, atapulgite, illite, bentonite, halloysite, talcum, soapstone, steatite, cerolite, magnesium talc, steatite-massive, and mixtures thereof.

8. The method of claim 1, where the cure system consists of the peroxide and the coagent-wetted carrier.

9. The method of claim 1, where said organic peroxide cure agent is delivered to said continuous mixing reactor together with an oil.

10. A method of preparing a thermoplastic vulcanizate, the method comprising:
   continuously mixing a feed stream of a rubber and a thermoplastic within a continuous mixing reactor to form a blend;
   adding a coagent carried by a carrier for the coagent to the rubber, the thermoplastic, the blend, or a combination of two or more thereof;
   adding a peroxide in combination with an oil to the rubber, the thermoplastic, the blend, or a combination of two or more thereof;
   continuously dynamically vulcanizing the rubber while the blend undergoes shear, where said continuously dynamically vulcanizing is effected solely with the peroxide cure agent in the presence of the coagent, and where the coagent consists essentially of (1) a multifunctional acrylate coagent selected from the group consisting of diethylene glycol diacrylate, trimethylolpropane triacrylate (TMPTA), ethoxylated trimethylolpropane triacrylate, propoxylated trimethylolpropane triacrylate, propoxylated glycerol triacrylate, pentaerythritol triacrylate, bistrimethylolpropane tetraacrylate, pentaerythritol tetraacrylate, ethoxylated pentaerythritol tetraacrylate, ethoxylated pentaerythritol triacrylate, cyclohexane dimethanol diacrylate, ditrimethylolpropane tetraacrylate, or combinations thereof, a multi-functional methacrylate coagent selected from the group consisting of ethylene glycol dimethacrylate, butanediol dimethacrylate, butylene glycol dimethacrylate, diethylene glycol dimethacrylate, polyethylene glycol dimethacrylate, allyl methacrylate or combinations thereof, or both a multi-functional acrylate and multi-functional methacrylate coagent and (2) silica, silicates, or a combination thereof.

11. The method of claim 10, where said adding a peroxide carried by an oil includes feeding an intimate blend of peroxide and oil to the rubber, the thermoplastic resin, the blend, or a combination of two or more thereof.

12. The method of claim 11, where the oil that carries the peroxide is a paraffinic oil.

13. The method of claim 10, where said coagent consists of a multi-functional acrylate coagent, a multi-functional methacrylate coagent, or both a multi-functional acrylate and multi-functional methacrylate coagent.

14. The method of claim 13, where said step of continuously dynamically vulcanizing is effected with a cure system that consists of the peroxide and a coagent selected from the group consisting of a multi-functional acrylate coagent, a multi-functional methacrylate coagent, or both a multi-functional acrylate and multi-functional methacrylate coagent.

15. The method of claim 10, where the rubber consists of an olefinic elastomeric copolymer.

16. The method of claim 1, where the coagent-wetted carrier consists of an intimate blend of:
   (1) a liquid selected from the group consisting of a multifunctional acrylate coagent selected from the group consisting of diethylene glycol diacrylate, trimethylolpropane triacrylate (TMPTA), ethoxylated trimethylolpropane triacrylate, propoxylated trimethylolpropane triacrylate, propoxylated glycerol triacrylate, pentaerythritol triacrylate, bistrimethylolpropane tetraacrylate, pentaerythritol tetraacrylate, ethoxylated pentaerythritol tetraacrylate, ethoxylated pentaerythritol triacrylate, cyclohexane dimethanol diacrylate, ditrimethylolpropane tetraacrylate, or combinations thereof, a multi-functional methacrylate coagent selected from the group consisting of ethylene glycol dimethacrylate, butanediol dimethacrylate, butylene glycol dimethacrylate, diethylene glycol dimethacrylate, polyethylene glycol dimethacrylate, allyl methacrylate or combinations thereof, and both a multi-functional acrylate and multi-functional methacrylate coagent, and
(2) an inert silica, silicates or a combination thereof, and where the olefinic elastomeric copolymer consists essentially of a ethylene-propylene-diene rubber wherein the diene consists essentially of units deriving from 5-ethylidene-2-norbornene.

17. The method of claim 16, where the coagent-wetted carrier includes from about 25% to about 80% by weight coagent based upon the total weight of the coagent-wetted carrier.

18. The method of claim 10, where adding a cogent carried by the carrier of the cogent includes feeding an intimate, physical blend of a liquid coagent and an inert carrer to the rubber, the thermoplastic resin, the blend, or a combination of two or more thereof, and where the coagent consists of a multi-functional acrylate coagent selected from the group consisting of diethylene glycol diacrylate, trimethylolpropane triacrylate (TMPTA), ethoxylated trimethylolpropane triacrylate, propoxylated trimethylolpropane triacrylate, propoxylated glycerol triacrylate, pentaerythritol triacrylate, bistrimethylolpropane tetraacrylate, pentaerythritol tetraacrylate, ethoxylated pentaerythritol tetraacrylate, ethoxylated pentaerythritol triacrylate, cyclohexane dimethanol diacrylate, ditrimethylolpropane tetraacrylate, or combinations thereof, a multi-functional methacrylate coagent selected from the group consisting of ethylene glycol dimethacrylate, butanediol dimethacrylate, butylene glycol dimethacrylate, diethylene glycol dimethacrylate, polyethylene glycol dimethacrylate, allyl methacrylate or combinations thereof, and both a multi-functional acrylate and multi-functional methacrylate coagent, and where the carrier consists of silica, silicates or a combination thereof, and where the olefinic elastomeric copolymer consists essentially of a ethylene-propylene-diene rubber wherein the diene consists essentially of units deriving from 5-ethylidene-2-norbornene.

19. A method of preparing a thermoplastic vulcanizate, the method comprising:
continuously dynamically vulcanizing a rubber within a continuous mixing reactor, where the rubber is contained within a blend, where the rubber consists of an olefinic elastomeric copolymer of ethylene, propylene, and at least one diene monomer, where the diene monomer consists of 5-ethylidene-2-norbornene, and where the blend includes a thermoplastic resin including a propylene-based resin and optionally one or more of reinforcing and non-reinforcing fillers, antioxidants, stabilizers, rubber process oils, lubricants, antiblocking agents, anti-static agents, waxes, foaming agents, pigments, flame retardants and processing aids; and where said step of continuously dynamically vulcanizing a rubber is effected solely with a single cure system that consists of: (i) an organic peroxide cure agent carried by an oil; and (ii) a coagent-wetted carrier consisting of (iia) a multi-functional acrylate coagent selected from the group consisting of diethylene glycol diacrylate, trimethylolpropane triacrylate (TMPTA), ethoxylated trimethylolpropane triacrylate, propoxylated trimethylolpropane triacrylate, propoxylated glycerol triacrylate, pentaerythritol triacrylate, bistrimethylolpropane tetraacrylate, pentaerythritol tetraacrylate, ethoxylated pentaerythritol tetraacrylate, ethoxylated pentaerythritol triacrylate, cyclohexane dimethanol diacrylate, ditrimethylolpropane tetraacrylate, or combinations thereof, a multi-functional methacrylate coagent selected from the group consisting of ethylene glycol dimethacrylate, butanediol dimethacrylate, butylene glycol dimethacrylate, diethylene glycol dimethacrylate, polyethylene glycol dimethacrylate, allyl methacrylate or combinations thereof, or both a multi-functional acrylate and multi-functional methacrylate coagent, and (iib) silica, silicates or a combination thereof.

\* \* \* \* \*